June 28, 1966    J. D. GILLESPIE    3,258,096
FLEXIBLE CHUTE
Filed March 30, 1965
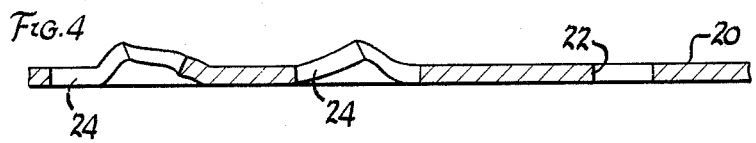
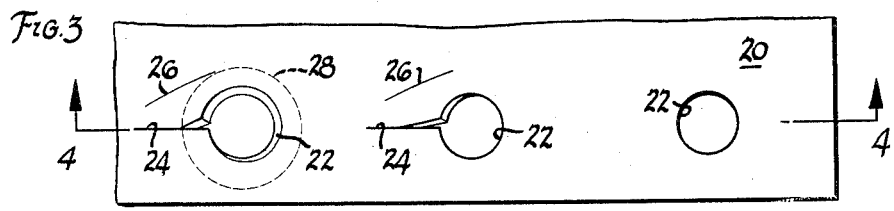
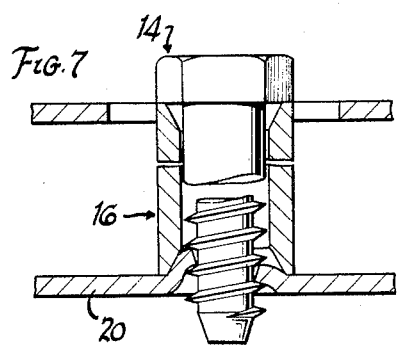
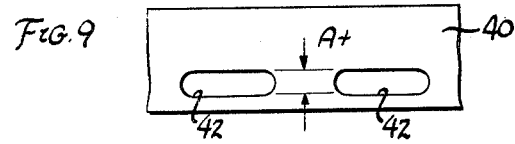
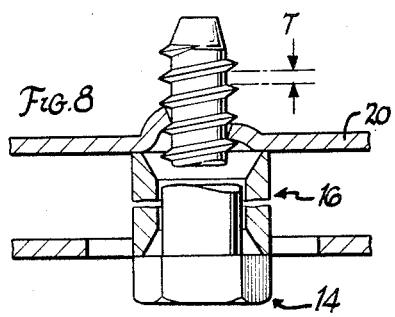
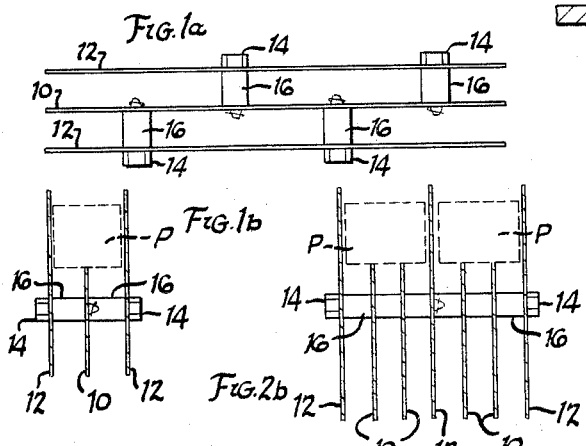
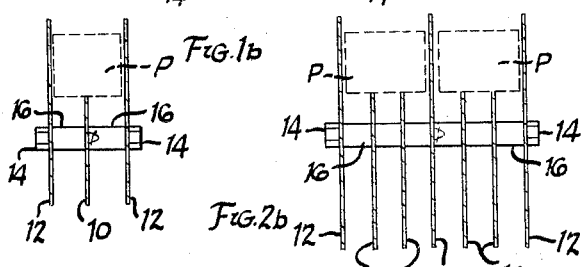
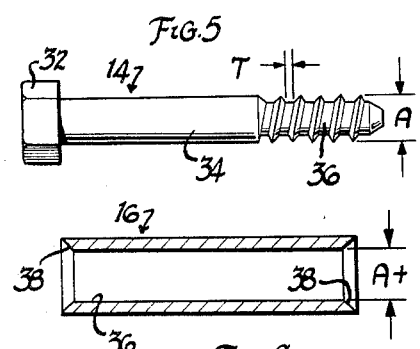
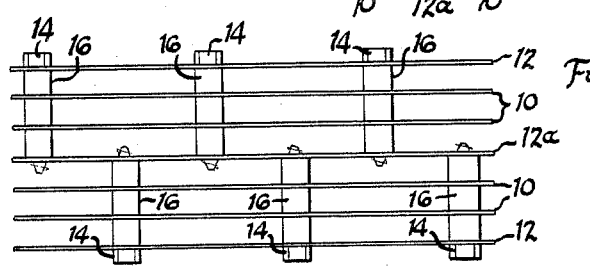
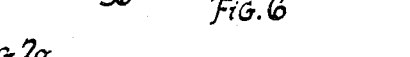
Inventor.
JOSEPH D. GILLESPIE
BY
Wilson, Settle & McKinnon
ATTORNEYS _United States Patent Office_  3,258,096
Patented June 28, 1966

1

3,258,096
FLEXIBLE CHUTE
Joseph D. Gillespie, Livonia, Mich., assignor to Hydromation Engineering Company, Livonia, Mich., a corporation of Michigan
Filed Mar. 30, 1965, Ser. No. 443,890
4 Claims. (Cl. 193—25)

This invention relates to gravity-type rail conveyors of the type wherein a plurality of flexible strips are disposed on edge in spaced parallel relationship to define a part conveying chute, and more particularly to improvements in such conveyors specially designed to facilitate assembly of the conveyor in the field.

A conveyor of the general type to which the present invention is directed is disclosed in Dabich Patent No. 2,815,841. As pointed out in the Dabich patent, one of the primary advantages of conveyors of this particular type is that it consists basically of strip steel stock of standardized sizes, nuts, bolts and spacers. It is thus readily adapted to be shipped in an unassembled condition and assembled at the point of use. The assembly of these conveyors frequently turns into a time consuming operation, especially where curves are involved. Even experienced assemblers are forced to rely primarily on cut and try techniques in which the conveyor is clamped in an approximate position by tightening all of the nuts and bolts, then unclamped and adjusted and reclamped. Frequently, several adjustments are required before the rails are accurately located in the desired position. Because of the presence of supporting framework, or in situations where several such conveyors are assembled into side-by-side relationship, the nuts and bolt heads are not always conveniently accessible to the assembler and the repeated cycle of unclamping, readjusting and reclamping becomes a tedious process. This is particularly true where the assembler must simultaneously employ two wrenches, one on the bolt head and one on the associated nut to clamp and unclamp the assembly.

It is primary object of the present invention to provide a rail conveyor construction especially adapted for rapid and efficient assembly and adjustment.

It is another object of the invention to provide a rail conveyor assembly especially adapted for assembly into a wide variety of configurations, particularly so with respect to multiple lane conveyors of this type.

The foregoing, and other objects are achieved in a rail conveyor construction in which an upset free-running bolt receiving thread is formed as an integral part of one of the rails of the conveyor. The bolt thread is formed with a configuration such that the bolt may be freely threaded into the rail from either side of the rail and a cooperating spacer is conformed to prevent the possibility of pulling out of the bolt when the bolt is threaded into the rail from that side of the rail from which the upset thread portion projects.

Other objects and features of the invention will become apparent by reference to the following specification and to the drawings.

In the drawings:
FIGURES 1a and 1b are respectively top plan and transverse cross sectional views of one exemplary form of conveyor embodying the present invention;
FIGURES 2a and 2b are respectively top plan and transverse cross sectional views of another conveyor arrangement;
FIGURE 3 is a partial plan view of a section of strip material showing successive steps in the formation of a helical thread in the strip;

2

FIGURE 4 is a transverse cross sectional view of the strip portion of FIGURE 3 taken on line 4—4 of FIGURE 3;
FIGURE 5 is a detail side elevational view of a bolt employed in the assemblies of FIGURES 1, 2, 5 and 6;
FIGURE 6 is a longitudinal cross sectional view showing details of a tubular spacer employed in conjunction with the bolt of FIGURE 5;
FIGURE 7 is a detail cross sectional view showing one form of assembly embodying the present inventions;
FIGURE 8 is a cross sectional view, similar to FIGURE 7, showing another form of assembly; and
FIGURE 9 is a partial view of a conventional rail employed in combination with the present invention.

In FIGURES 1a, 1b, 2a and 2b, there are disclosed exemplary arrangements of rail conveyors or chuting of the type with which the present invention is concerned. Conveyors of this type are constructed from a plurality of rails of flexible strip metal stock disposed on edge and held in spaced parallel relationship with each other by means of spacers disposed between the rails.

Experience has shown it to be desirable to heat treat or temper the steel strip stock for service as rails in this type of conveyor and the strips preferably take the form of a tempered or blued steel.

In the arrangement of FIGURES 1a and 1b, a single centrally disposed carrier rail 10 is positioned mid-way between a pair of outer side rails 12. This arrangement may act as a gravity conveyor for a part P of cylindrical configuration which rolls along the upper edge of carrier rail 10 and is guided by the opposed side rails 12. The various rails are held in assembled relationship with each other by a series of bolts 14 upon which tubular spacers 16 are mounted to maintain the desired spacing between the rails. Bolts 14 pass through an opening in side rail 12 and are threaded into a nut section formed on carrier rail 10 in a manner to be described in more detail below.

In FIGURES 2a and 2b, a multi-lane form of conveyor is shown which is adapted to convey parts along two adjacent paths or lanes wth one side rail 12a common to both lanes. In this case, two carrier rails 10 are employed in each lane, each bolt 14 carrying three spacers to separate the two carrier rails of each lane. In this case, the bolts pass through the outer side rails 12 and are threaded into the center or common side rail 12a. The manner in which the bolts are threadably received in one of the rails of the assembled conveyor is best shown in FIGURES 3 through 8 inclusive. Referring first to FIGURRES 3 and 4, a bolt receiving opening is formed in a piece of strip stock 20 of the desired dimensions by a progressive die operation indicated in FIGURES 3 and 4, which operation is adapted to be performed on the strip after it has been tempered. The successive steps in the die occur from right to left as viewed in these figures, the first step being the formation of a circular hole 22 in the strip 20. At the next station in the die, strip 20 is slit as at 24 radially from opening 22 and one corner of the juncture of slit 24 and opening 22 is bent upwardly roughly along a diagonally extending fold line 26. In the next step, material around the periphery of opening 22 disposed radially inwardly of circle 28 is upset from strip 22 to form the edge of opening 22 into a true helix so that the opening, in its final configuration, constitutes a complete single internal helical thread. The thread, at one side of slit 24 lies in the general plane of the rail or strip 20, while the opposite side of the slit is upset from the general plane of the rail by a distance corresponding to the pitch of the thread of bolt 14.

The dimensions of the thread formed as described above in the strip are matched to the thread of bolts 14 shown in detail in FIGURE 5, the bolt being especially formed for its intended purpose. Bolt 14 as shown in FIGURE 5, includes a standard head 32 and a relatively long cylindrical shank section 34 of an outer diameter A. The shank section terminates in a relatively short threaded section 36. The thread of section 36 is formed with a major diameter A which is substantially the same as the outer diameter of shank section 34. An axial spacing T or root flat dimension of the thread is selected to be equal to the thickness of the strip 20 into which the bolt is to be threaded.

By forming the nut-thread section in strip 20 into true helical form, with its pitch corresponding to that of the thread of bolt 14, bolt 14 is capable of free running threading into the nut section of the strip from either side of the strip as indicated in FIGURES 7 and 8.

Bolts 14 are employed in conjunction with hollow tubular spacers 16 such as shown in cross section in FIGURE 6. Spacers 16 are constructed with an internal bore 36 of a diameter only slightly greater than the outer diameter of shank section 34 of bolt 14 so that the spacer can be slipped easily upon the bolt shank but has only a slight amount of play radially when in position upon the bolt. At each end of the spacer, a chamfer 38 is cut, the purpose of the chamfer being to bear against the upset portion of the rail when the bolt is threaded into the bolt receiving openings of strip 20 from the "wrong" side, as shown in FIGURE 7. As best seen in FIGURES 1a and 2a, the purpose of the spacer is to establish the spacing between adjacent rails in the assembled conveyor, and its length is selected accordingly.

Each conveyor assembly embodying the present invention will include at least one rail 20 constructed with bolt receiving openings 22. The remaining rails 40 (FIGURE 9) are formed with a series of elongated openings 42 of a width slightly greater than the shank diameter of bolts 14 so that the bolts can be freely passed through openings 42. The elongation of openings 42 accommodates a range of longitudinal positioning of the bolt within the opening which is necessitated by the fact that conveyors of this type are frequently constructed to follow curved paths.

Conveyors of the present type are primarily used in assembly line systems to convey parts to and from machines. They are customarily assembled at the point of use, and the present invention is primarily addressed to providing greater speed and convenience in assembly than is possible with previously known systems of this type.

Because the nut is formed as an integral part of one of the rails, the advantage of being able to dispense with conventional individual nuts and washers is believed apparent. The formation of the nut section into a true helix so that a free runing threaded engagement between the bolt and nut section is possible further provides the advantage in that the bolt can be threaded into the nut section from either side of the rail as shown in FIGURES 7 and 8. Additionally, a guiding action of the bolt into the nut is achieved in either direction, the upset nut section providing a guiding recess when the bolt is threaded from the "right" side as in FIGURE 8, while the seating engagement of the chamfered end of spacer 16 with the upset nut section provides the guiding action when the bolt is threaded from the "wrong" side as in FIGURE 7. The assembly is self locking in either of the FIGURE 7 or 8 arrangement, tightening of the bolt in the FIGURE 8 arrangement pulling the nut edges radially inwardly against the bolt while the chamfered edges of spacer 16 force the nut edges in against the bolt in the FIGURE 7 arrangement.

Because the bolt may be readily threaded into the integral nut from either side of the rail, the disclosed arrangement is particularly well adapted for use in multi-lane conveyors in which a plurality of paths are disposed in side-by-side relationship with a side rail being common to two adjacent paths.

While specific embodiments and applications of the invention have been described in detail, it will be apparent to those skilled in the art that the disclosed embodiments and applications may be modified. Therefore, the foregoing description is to be considered exemplary rather than limiting, and the true scope of the invention is that defined in the following claims.

I claim:

1. In a rail conveyor having a plurality of rails of flexible strip material disposed on edge, and means for securing said rails to each other in spaced parallel relationships; the improvement wherein said securing means comprises a plurality of headed bolts each having a relatively long cylindrical shank section of a first diameter extending from the bolt head and a relatively short threaded section extending coaxially from said shank section, said threaded section having a major thread diameter substantially equal to said first diameter and an axial thread spacing equal to the thickness of one of said rails, said one of said rails having a series of bolt receiving openings therethrough, said one rail being upset around the periphery of each opening to define a complete single internal helical thread matching the thread of said bolt to accommodate free running threading of the bolt into the bolt receiving opening of the rail, means defining bolt receiving holes through the remaining rails adapted to receive the shank sections of said bolts, and tubular spacers each having a central bore therethrough slidably mounted upon the shank sections of said bolts to maintain said rails in spaced parallel relationship to each other said tubular spacers having an annular chamfer outwardly divergent from each end of the bore therethrough, said chamfers being adapted to bear against the upset portion of the rail about the periphery of a bolt receiving opening.

2. In a rail conveyor having a plurality of flexible, hard, tempered spring steel rails disposed on edge and capable of supporting appreciable loads over an appreciable unsupported reach, and means for securing said rails to each other in spaced parallel relationships; the improvement wherein said securing means comprises a plurality of headed bolts, each such bolt having coarse lag-type threads in which the root flat dimension between adjacent threads substantially equals the thickness of one of said rails, said one of said rails having a series of circular bolt receiving openings therethrough of a diameter substantially equal to the root diameter of the bolt thread, said rail having a slit therethrough extending radially from each opening and being upset around the periphery of each opening to define a complete internal helical thread substantially matching the thread of said bolt to accommodate free running threading of the bolt into the bolt receiving opening from either side of the rail, means defining bolt receiving holes through the remaining rails adapted to receive said bolt, and tubular spacers slidably mounted upon said bolt and interposed between adjacent rails to maintain said rails in spaced parallel relationship to each other.

3. In a rail conveyor as defined in claim 2; the further improvement wherein the upset portion of the rail is confined to an annular region surrounding the periphery of the opening, the edge of the opening being conformed to a helix extending from a first point lying in the general plane of the rail at one side of said slit to a second point at the opposite side of said slit offset from the general plane of the rail by a distance corresponding to the pitch of the thread of said bolt.

4. In a rail conveyor as defined in claim 3; the further improvement wherein said spacers have an annular chamfer diverging outwardly from each end of the central bore, said chamfer being adapted to bear against the upset portion of the rail when a bolt upon which the spacer is mounted is threaded into that side of the rail from which the upset portion projects.

References Cited by the Examiner
UNITED STATES PATENTS

| | | | |
|---|---|---|---|
| 1,599,139 | 9/1926 | Marshall | 29—532 |
| 2,815,841 | 12/1957 | Dabich | 193—25 |
| 2,948,375 | 8/1960 | Dabich | 193—35 |
| 3,044,165 | 7/1962 | Munse | 29—532 |

EVON C. BLUNK, *Primary Examiner.*

SAMUEL F. COLEMAN, A. L. LEVINE,
*Assistant Examiners.*